(No Model.) 2 Sheets—Sheet 1.

R. C. FUNKE.
HAMMOCK STRETCHER OR SPREADER.

No. 518,568. Patented Apr. 17, 1894.

Witnesses:
John W. Achard
Katie M. Gilligan

Inventor:
Robert C. Funke
by
Augustus B Stoughton
his Attorney.

(No Model.) 2 Sheets—Sheet 2.
R. C. FUNKE.
HAMMOCK STRETCHER OR SPREADER.
No. 518,568. Patented Apr. 17, 1894.
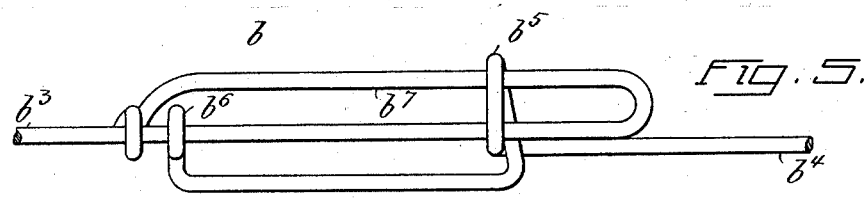
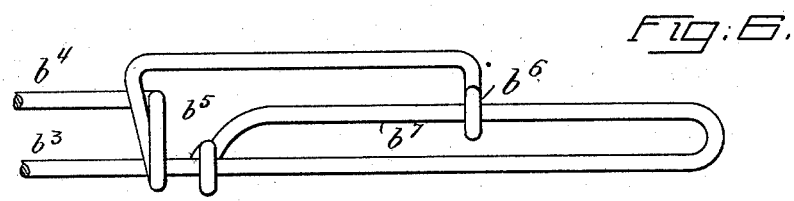
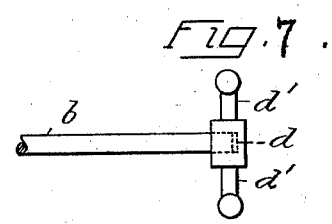

UNITED STATES PATENT OFFICE.

ROBERT C. FUNKE, OF PHILADELPHIA, PENNSYLVANIA, ASSIGNOR TO SAMUEL CORKRAN, OF SAME PLACE.

HAMMOCK STRETCHER OR SPREADER.

SPECIFICATION forming part of Letters Patent No. 518,568, dated April 17, 1894.

Application filed October 28, 1893. Serial No. 489,347. (No model.)

*To all whom it may concern:*

Be it known that I, ROBERT C. FUNKE, a citizen of the United States, residing at the city of Philadelphia, in the county of Philadelphia and State of Pennsylvania, have invented certain new and useful Improvements in Hammock Stretchers or Spreaders, of which the following is a specification.

The principal objects of my present invention are, first, to provide simple, durable, and efficient means for connecting a hammock with its spreader or stretcher, and second, to provide compact and efficient means for permitting the stretcher or spreader to be folded upon itself when not in use, and to be locked in operative position.

My invention consists of the improvements hereinafter described and particularly referred to in the claims.

The nature, characteristic features, and scope of my invention will be more fully understood from the following description taken in connection with the accompanying drawings forming part hereof, and in which—

Figure 1:
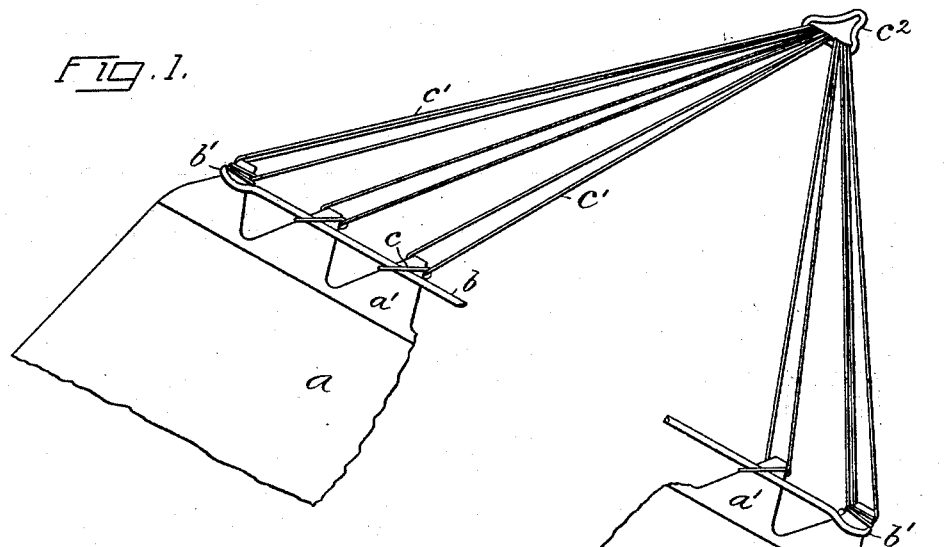
Figure 2:
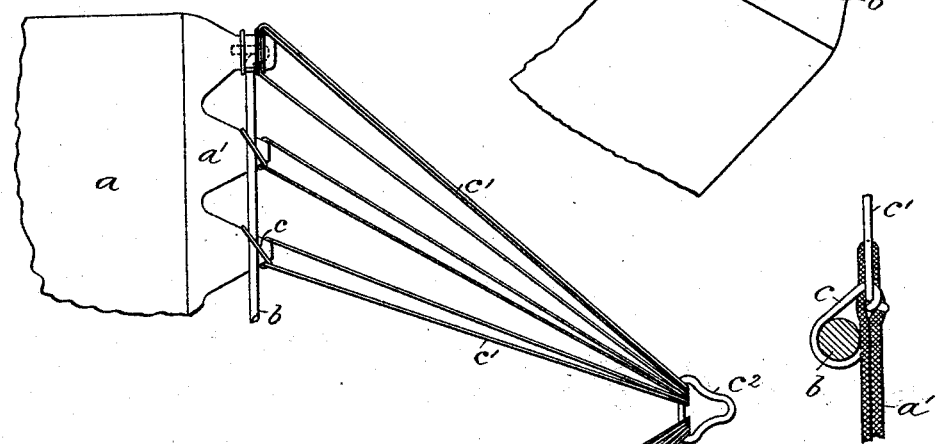
Figure 3:
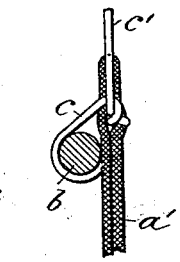
Figure 4:
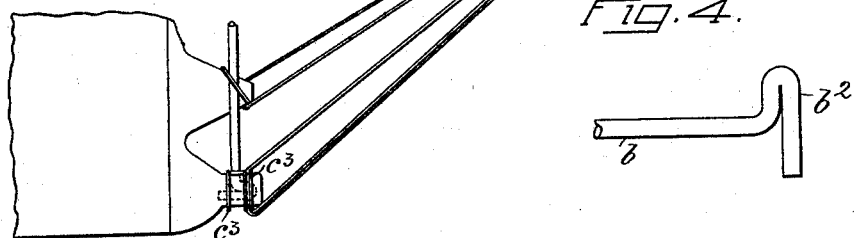

Figure 1, is a perspective view of so much and such parts of a hammock and its stretcher or spreader as is necessary to illustrate my improved means for securing the intermediate portions of the hammock to its stretcher. Fig. 2, is a top or plan view of one end of a hammock having its intermediate portions connected with the stretcher or spreader and having its end portions secured to the spreader or stretcher by means embodying features of my invention. Fig. 3, is a side elevational view partly in section, drawn to an enlarged scale and illustrating one of the intermediate tabs or tags shown in Figs. 1 and 2, and illustrating the stretcher or spreader secured to place by a cord. Fig. 4, is a view drawn to an enlarged scale and illustrating the end shoulder of the spreader or stretcher shown in Fig. 2. Fig. 5, is a view illustrating the intermediate portion of a folding spreader or stretcher in open or operative position and constructed according to my invention. Fig. 6, is a similar view illustrating the intermediate parts of the folding stretcher or spreader in folded position, and Fig. 7 is a view of the modified form of the construction of end shoulders shown in Fig. 4.

In the accompanying drawings, $a$, is a hammock provided at one or both of its ends with tabs or tags $a'$. These tabs or tags may comprise only the warp ends of the hammock $a$, or they may comprise both the warp and weft thereof, or they may be formed in any preferred manner.

$b$, is a stretcher or spreader comprising a rod or bar of iron, wood, or other material and of any preferred shape in cross section. The intermediate portion of this spreader or stretcher $b$, is secured to the tabs or tags $a'$, by means of a cord or cords $c$. These cords $c$, comprise parts of the suspension cord or cords $c'$, that are connected with the usual eye or ring $c^2$. In such case, the intermediate suspension cords pass around the stretcher or spreader $b$, as shown in Fig. 3, and also are tied through or otherwise secured to the corresponding tabs or tags. The function of the cords $c$, is to tie each tab or tag to the stretcher or spreader whereby endwise motion of the latter is prevented. It may be remarked that any weight upon the hammock $a$, tends to draw the cords $c$, tightly around the stretcher or spreader, thus tending to insure freedom from endwise movement of the stretcher or spreader and from any slipping of the intermediate tabs or tags thereon.

The ends of the spreader or stretcher $b$, are secured to the end tabs or tags of the hammock. This result may be accomplished as shown in Fig. 1, by providing rings $b'$, at the ends of the spreader or stretcher and causing said rings to encircle the end tabs or tags or their corresponding suspension cords $c'$, as may be preferred.

In Figs. 3 and 7, I have illustrated means embodying features of my invention for securing the ends of the spreader or stretcher to the end tabs or tags of the hammock.

In Fig. 2, the spreader or stretcher is provided with end shoulders or projections $b^2$, formed or forged and which are tied into or onto the end tabs or tags by means of cords $c^3$, Fig. 2, which comprise parts of the suspension cord or cords $c'$.

In some instances, it is desirable that the spreader or stretcher should be susceptible of being folded when not in use. Figs. 5 and 6, illustrate such an arrangement. In this instance, the stretcher or spreader $b$, comprises two members $b^3$ and $b^4$, whereof one is provided with two eyes $b^5$ and $b^6$, ranging parallel to each other and transversely of the member $b^4$, and whereof the other $b^3$, is provided with a closed loop or long eye $b^7$, having one of its parts passed through the eye $b^6$, and both of its parts adapted for insertion in and removal from the eye $b^5$, in order to lock the spreader in open or operative position, Fig. 5, or permit it to be turned into closed position, Fig. 6.

It may be remarked that the arrangement illustrated in Figs. 5 and 6, is applicable to stretchers or spreaders that are secured to all the tabs or tags $a'$, as illustrated in Figs. 1 and 2, and also to stretchers or spreaders that are attached to or connected with only some of the tabs or tags $a'$.

In Fig. 7, the projections $d'$, are cast integral with a socket $d$, applied to the ends of the spreader, instead of being forced or bent upon the ends of the same as shown in Fig. 4. The former construction, i. e., the one shown in Fig. 7, is mechanically cheaper and possibly preferable though perhaps not patentably different from the latter.

Having thus described the nature and objects of my present invention, what I claim as new, and desire to secure by Letters Patent, is—

1. In combination, a hammock having a series of tabs or tags at its end, a stretcher or spreader secured to the end tabs or tags, and a series of suspension cords whereof the intermediate ones pass around said stretcher or spreader and tie the intermediate tabs or tags firmly thereto, substantially as described.

2. In combination, a hammock having a series of tabs or tags, a stretcher or spreader provided with transversely ranging end shoulders, and a cord or cords passing around the stretcher or spreader and the end shoulders and tying the intermediate and end tabs or tags thereto, substantially as described.

3. In combination, a hammock having a series of tabs or tags at its end, a stretcher or spreader provided with transversely ranging end shoulders or enlargements, and a series of suspension cords whereof the intermediate ones are tied around said stretcher or spreader and support the intermediate tabs or tags and whereof the end ones are tied around the shoulders or projections on opposite sides of the spreader and support the end tabs or tags, substantially as described.

4. In combination, a hammock having a series of tabs or tags, a stretcher or spreader having transversely ranging end shoulders or enlargements, and a cord or cords passing around the spreader or stretcher and the end shoulders and tying the end tabs or tags of said series thereto, substantially as described.

5. In combination, a hammock having a series of tabs or tags, and a stretcher or spreader secured to some of said tabs or tags and comprising two members whereof one is provided with two eyes and whereof the other is provided with a loop engaging one of said eyes and adapted for insertion in and removal from the other of said eyes, substantially as described.

In testimony whereof I have hereunto subscribed my name in the presence of two witnesses.

ROBERT C. FUNKE.

Witnesses:
A. B. STOUGHTON,
KATIE M. GILLIGAN.

It is hereby certified that Letters Patent No. 518,568, granted April 17, 1894, upon the application of Robert C. Funke, of Philadelphia, Pennsylvania, for an improvement in "Hammock Stretchers or Spreaders," was erroneously issued to Samuel Corkran, as owner of the entire interest in said invention; that said Letters Patent should have been issued to the inventor, *Robert C. Funke, and said Samuel Corkran, jointly,* said Corkran being the assignee of one-half interest only in said patent, as shown by the record of assignments in this Office; and that the Letters Patent should be read with this correction therein that the same may conform to the record of the case in the Patent Office.

Signed, countersigned, and sealed this 8th day of May, A. D. 1894.

[SEAL.]

JNO. M. REYNOLDS,
*Assistant Secretary of the Interior.*

Countersigned:
    JOHN S. SEYMOUR,
        *Commissioner of Patents.*